US009824421B2

(12) United States Patent
Ragozin et al.

(10) Patent No.: US 9,824,421 B2
(45) Date of Patent: Nov. 21, 2017

(54) CONTENT-AWARE IMAGE RESIZING USING SUPERPIXELS

(75) Inventors: Dmitry Ragozin, Nizhny Novgorod (RU); Alexander Sapatov, Moscow (RU)

(73) Assignee: Intel Corporation, Santa Clara, CA (US)

( * ) Notice: Subject to any disclaimer, the term of this patent is extended or adjusted under 35 U.S.C. 154(b) by 440 days.

(21) Appl. No.: 13/977,279

(22) PCT Filed: Jan. 25, 2012

(86) PCT No.: PCT/RU2012/000031
§ 371 (c)(1),
(2), (4) Date: Oct. 9, 2013

(87) PCT Pub. No.: WO2013/112064
PCT Pub. Date: Aug. 1, 2013

(65) Prior Publication Data
US 2014/0028727 A1     Jan. 30, 2014

(51) Int. Cl.
*G09G 5/00* (2006.01)
*G06T 3/40* (2006.01)
*G06T 3/00* (2006.01)

(52) U.S. Cl.
CPC .............. *G06T 3/40* (2013.01); *G06T 3/0012* (2013.01)

(58) Field of Classification Search
CPC ... G09G 2340/0407; G06T 3/40; G06T 11/60; G06T 3/00; G06T 7/0081; G06F 3/0481

(Continued)

(56) References Cited

U.S. PATENT DOCUMENTS

| 6,792,329 B2 | 9/2004 | Adams, Jr. et al. |
| 7,747,107 B2 | 6/2010 | Avidan et al. |

(Continued)

FOREIGN PATENT DOCUMENTS

| RU | 2321063 C2 | 3/2008 |
| TW | 201140556 A | 11/2011 |
| WO | 2013112064 A1 | 8/2013 |

OTHER PUBLICATIONS

Drucker, Fabio, et al., "Fast Superpixels for Video Analysis", Motion and Video Computing, 2009. WMVC'09. Workshop on. IEEE, 2009, pp. 1-8.*

(Continued)

*Primary Examiner* — Xiao Wu
*Assistant Examiner* — Sarah Lhymn
(74) *Attorney, Agent, or Firm* — Barnes & Thornburg LLP

(57) ABSTRACT

Illustrative embodiments of methods, machine-readable media, and computing devices that provide content-aware image resizing using superpixels are disclosed. In some embodiments, a method may include segmenting a machine-readable image file into a plurality of superpixels, where each of the plurality of superpixels corresponds to a plurality of pixels of the machine-readable image file. The method may also include selecting a target region in the machine-readable image file, where the target region includes the pixels corresponding to a seam of superpixels extending across a dimension of the machine-readable image file. The method may further include selecting a seam of pixels in the target region, where the seam of pixels extends across the dimension of the machine-readable image file, and resizing the machine-readable image file by removing or augmenting the seam of pixels.

25 Claims, 5 Drawing Sheets

(58) Field of Classification Search
USPC ....... 345/619, 621, 625, 627, 628, 639, 642, 345/643, 645, 660, 661, 664, 665, 666, 345/668, 670, 671, 682; 382/173, 276, 382/277, 282
See application file for complete search history.

(56) References Cited

U.S. PATENT DOCUMENTS

| | | |
|---|---|---|
| 2003/0185439 A1 | 10/2003 | Malvar |
| 2005/0168460 A1* | 8/2005 | Razdan et al. ................ 345/419 |
| 2005/0216237 A1 | 9/2005 | Adachi et al. |
| 2007/0116347 A1 | 5/2007 | Hong |
| 2010/0027876 A1 | 2/2010 | Avidan et al. |

OTHER PUBLICATIONS

Gordon, Shiri, et al., "Segmentation of Non-convex Regions Within Uterine Cervix Images." Biomedical Imaging: From Nano to Macro, 2007. ISBI 2007. 4th IEEE International Symposium on. IEEE, 2007, pp. 312-315.*

Achanta, Radhakrishna, and Sabine Süsstrunk, "Saliency Detection for Content-Aware Image Resizing", Image Processing (ICIP), 2009 16th IEEE International Conference, pp. 1005-1008.*

International Search Report and Written Opinion received for International Application No. PCT/RU2012/000031, mailed on Oct. 25, 2012, 7 pages.

"Seam carving," Wikipedia, The Free Encyclopedia, available: [http://en.wikipedia.org/w/index.php?title=Seam_carving &oldid=448109014], edited Sep. 2, 2011, 6 pages.

Avidan et al., "Seam Carving for Content-Aware Image Resizing," ACM Transactions on Graphics (TOG), Proceedings of the 2007 SIGGRAPH Conference, vol. 26, Issue 3, Jul. 2007, 9 pages.

Korean Office Action, Search Report, and English Translation for Application No. 102101109, dated May 28, 2015, 15 pages.

English translation of Taiwanese Office Action and Search Report, Taiwanese Patent Application No. 102101109, dated Sep. 18, 2014, 20 pages.

* cited by examiner

CONTENT-AWARE IMAGE RESIZING USING SUPERPIXELS

BACKGROUND

Conventional image resizing methods typically involve the scaling and/or cropping of machine-readable image files. In many image resizing scenarios—particularly when changing the aspect ratio of an image (e.g., from 4:3 to 16:9)—both scaling and cropping fail to adequately protect the content of the image, image scaling typically can only be applied uniformly and, thus, often results in visual distortions of important image content when the aspect ratio of an image is modified image cropping typically can only remove pixels from the image periphery, even though important image content may be located along the image periphery.

An improved, content-aware image resizing method that removed or inserted pixels along optimal minimum energy paths and, thereby, avoided obscuring important (i.e., higher energy) image content was described in S. Avidan et al., "Seam Carving for Content Aware Image Resizing," 26 ACM Transactions on Graphics 10-18 (2007). As disclosed in that article, as well as in U.S. Pat. No. 7,747,107 to Avidan et al., the method includes applying an energy function (e.g., gradient magnitude, entropy, etcetera) to a source image to determine the "importance" of each pixel in the source image. A seam (i.e., a set of pixels, one pixel wide, crossing the image from one edge to an opposite edge) having minimal energy is then determined using dynamic programming. Finally, the seam of pixels is either removed to reduce the size of the image or augmented (i.e., pixels are inserted along the seam) to enlarge the size of the image. As such, that content-aware image resizing method is often referred to as "seam carving." The algorithm may be repeated in horizontal and/or vertical dimensions to achieve the desired image resizing, while preserving the content of the image as defined by the energy function).

The foregoing content-aware image resizing method, however, is computationally intensive and slow, primarily due to the use of dynamic programming to search for a minimal energy seam through all pixels of the source image. For instance, resizing a single image often requires several seconds (e.g., about 5 seconds to reduce a 600×800 pixel image's width by half). Systems and methods that provide more computationally efficient content-aware image resizing may allow a user of a mobile computing device to perform on-the-fly editing of images captured by a camera of the mobile computing device.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
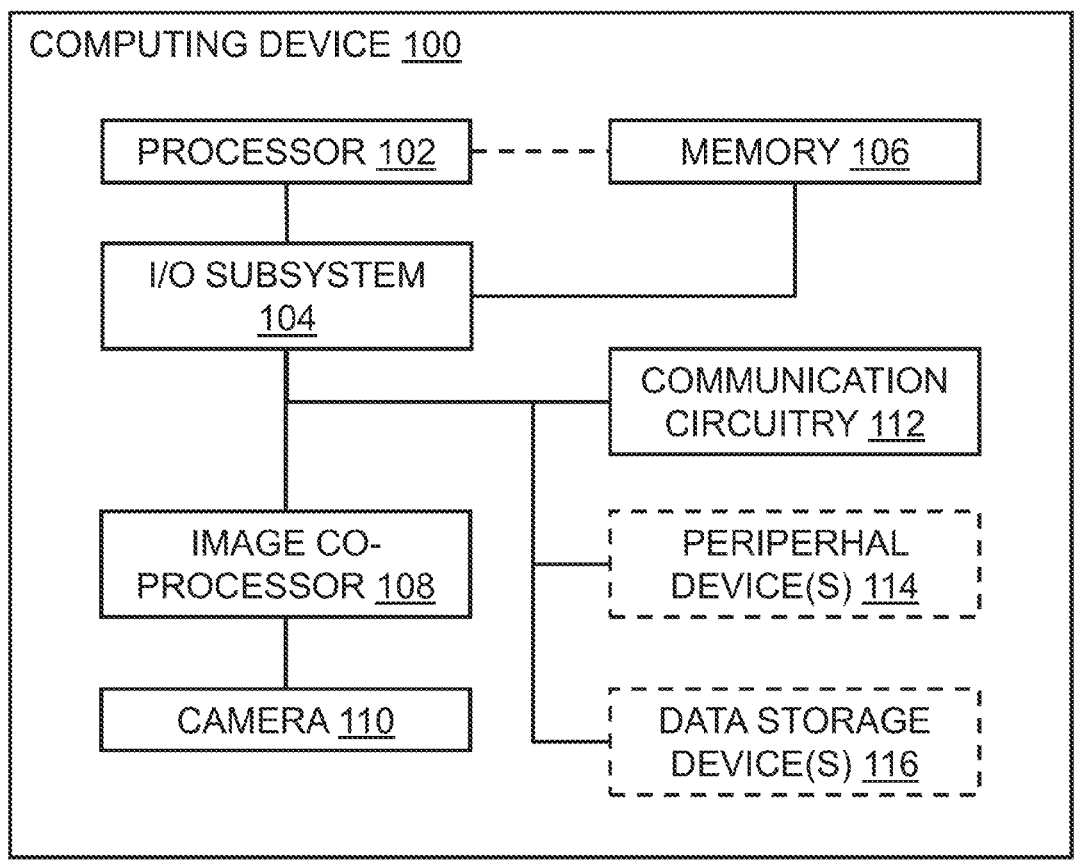
FIG. 1 is a simplified block diagram of at least one embodiment of a computing device including a camera and an image co-processor configured to provide content-aware resizing of an image captured by the camera using superpixels.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etcetera, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computing device may include one or more bus-based, or link-based, interconnects between components and/or one or more point-to-point interconnects between components. Embodiments of the invention may also be implemented as instructions carried by or stored on one or more machine-readable media, which may be read and executed by one or more processors. A machine-readable medium may be embodied as any device, mechanism, or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, electrical signals, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments, and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements (e.g., solid or dashed lines or arrows) are used to illustrate a connection, relationship, or association between or among two or more schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships, or associations between elements. For example, where a connecting element represents a communication of signals, data, or instructions, it should be understood by those skilled in the art that such element may represent one or multiple signal paths (e.g., a bus), as may be needed, to effect the communication.

The present disclosure generally relates to systems and methods that provide content-aware resizing of a machine-readable image file using superpixels. By the term "image," the present disclosure refers both to still images and to videos (which, it will be appreciated, comprise a series of still images that may be processed in a similar manner) and contemplates both two-dimensional (2D) and three-dimensional (3D) images and videos. The presently disclosed systems and methods may be used in a computing device, such as the mobile computing device 100 illustrated in FIG. 1, by way of example. As described in more detail below (with reference to the simplified flow diagram illustrated in FIG. 2), the presently disclosed systems and methods may segment an image into a plurality of superpixels that each correspond to a plurality of pixels of the image. The systems and methods may then select a target region in the image that includes the pixels corresponding to a seam of superpixels extending across a dimension of the image. After selecting such a target region, the systems and methods may select a seam of pixels in the target region that extends across the same dimension of the image. Finally, the systems and methods may resize the image by removing or augmenting the seam of pixels. By limiting the search for an appropriate seam of pixels to the target region (rather than the entire image), the presently disclosed systems and methods may provide more computationally efficient content-aware image resizing. The presently disclosed systems and methods will be further described with reference to several illustrative embodiments of images, shown in FIGS. 3-5.

Referring now to FIG. 1, one illustrative embodiment of a computing device 100 that may provide content-aware resizing of an image using superpixels is shown as a simplified block diagram. The computing device 100 may be embodied as any type of electronic device capable of performing the functions described herein. By way of example, the computing device 100 may be embodied as a personal computer, a workstation, a laptop computer, a handheld computer, a mobile internet device, a cellular phone, a personal data assistant, a telephony device, a network appliance, a virtualization device, a storage controller, or other computer-based device. In the illustrative embodiment shown in FIG. 1, the computing device 100 is embodied as a mobile computing device (e.g., a mobile internet device) including a processor 102, an I/O subsystem 104, a system memory 106, an image co-processor 108, a camera 110, and communication circuitry 112. The computing device 100 may also optionally include one or more peripheral devices 114 and one or more data storage devices 116. Furthermore, it should be appreciated that the computing device 100 may include other components, sub-components, and devices commonly found in a computer and/or computing device, which are not illustrated in FIG. 1 for clarity of the description.

The processor 102 of the computing device 100 may be any type of processor capable of executing software/firmware, such as a microprocessor, digital signal processor, microcontroller, or the like. It is contemplated that the processor 102 may be embodied as a single core processor or as a multi-core processor. The processor 102 functions as a primary processor (or central processing unit) of the computing device 100 and is generally responsible for executing a software stack, which may include an operating system and various applications, programs, libraries, and drivers resident on the computing device 100.

The processor 102 is communicatively coupled to the I/O subsystem 104 via a number of signal paths. These signal paths (and other signal paths illustrated in FIG. 1) may be embodied as any type of signal paths capable of facilitating communication between the components of the computing device 100. For example, the signal paths may be embodied as any number of wires, cables, light guides, printed circuit board traces, via, bus, intervening devices, and/or the like. The I/O subsystem 104 of the computing device 100 may be embodied as circuitry and/or components to facilitate input/output operations with the processor 102 and/or other components of the computing device 100. In some embodiments, the I/O subsystem 104 may be embodied as a memory controller hub (MCH or "northbridge"), an input/output controller hub (ICH or "southbridge"), and a firmware device. In other embodiments, I/O subsystems having other configurations may be used. For example, in some embodiments, the I/O subsystem 104 may be embodied as a platform controller hub (PCH). In such embodiments, the memory controller hub (MCH) may be incorporated in or otherwise associated with the processor 102, and the processor 102 may communicate directly with the system memory 106 (as shown by the hashed line in FIG. 1). In still other embodiments, the I/O subsystem 104 may form a portion of a system-on-a-chip (SoC) and be incorporated, along with the processor 102 and other components of the computing device 100, on a single integrated circuit chip.

The system memory 106 of the computing device 100 is also communicatively coupled to the I/O subsystem 104 via a number of signal paths. The system memory 106 may be embodied as one or more memory devices or data storage locations including, for example, dynamic random access memory devices (DRAM), synchronous dynamic random access memory devices (SDRAM), double-data rate synchronous dynamic random access memory device (DDR SDRAM), flash memory devices, and/or other volatile memory devices. Additionally, although only a single system memory device 106 is illustrated in FIG. 1, in other embodiments, computing device 100 may include additional system memory devices. In some embodiments, the system memory 106 may utilized as a shared memory that is accessible to additional processors of the computing device 100, such as the image co-processor 108.

The computing device 100 also includes an image co-processor 108 that serves to off-load image processing functions from the primary processor 102. The image co-processor 108 may be any type of processor capable of executing software/firmware, such as a microprocessor, digital signal processor, microcontroller, or the like. The image co-processor 108 is communicatively coupled to a camera 110 of the computing device 100 via a number of signals paths and receives machine-readable image files (including still images and/or videos) captured by the camera 110. As illustrated in FIG. 1, the image co-processor 108 may also be communicatively coupled to the I/O subsystem 104 via a number of signal paths. In some embodiments, the image co-processor 108, the primary processor 102, and the I/O subsystem 104 may all be part of an SoC and be incorporated on a single integrated circuit chip.

The communication circuitry 112 of computing device 100 may be embodied as any number of devices and circuitry for enabling communications between the computing device 100 and one or more networks (now shown), including, but not limited to, local area networks, wide area networks, publicly available global networks (e.g., the Internet), and/or other networks. The communication circuitry 112 may include one or more wired and/or wireless network interfaces to facilitate communications over the wired and/or wireless portions of these networks. Communication circuitry 112 is also communicatively coupled to the I/O subsystem 104 via a number of signal paths.

The computing device 100 may also optionally include one or more peripheral devices 114 and one or more data storage devices 116. By way of illustrative example, the peripheral device(s) 114 may include a display, a touchpad, a touchscreen, a keyboard, a microphone, and/or one or more external speakers. The particular peripheral device(s) 114 included in the computing device 100 may depend upon, for example, the intended use of the computing device 100. The data storage device(s) 116 may be illustratively embodied as any type of device configured for the short-term or long-term storage of data such as, for example, memory devices and circuits, memory cards, solid-state drives, hard disk drives, or other data storage devices. When present, the peripheral device(s) 114 and the data storage device(s) 116 are each communicatively coupled to the I/O subsystem 104 via a number of signal paths, allowing the I/O subsystem 104 to receive inputs from and send outputs to the peripheral device(s) 114 and/or to the data storage device(s) 116.

Figure 2:
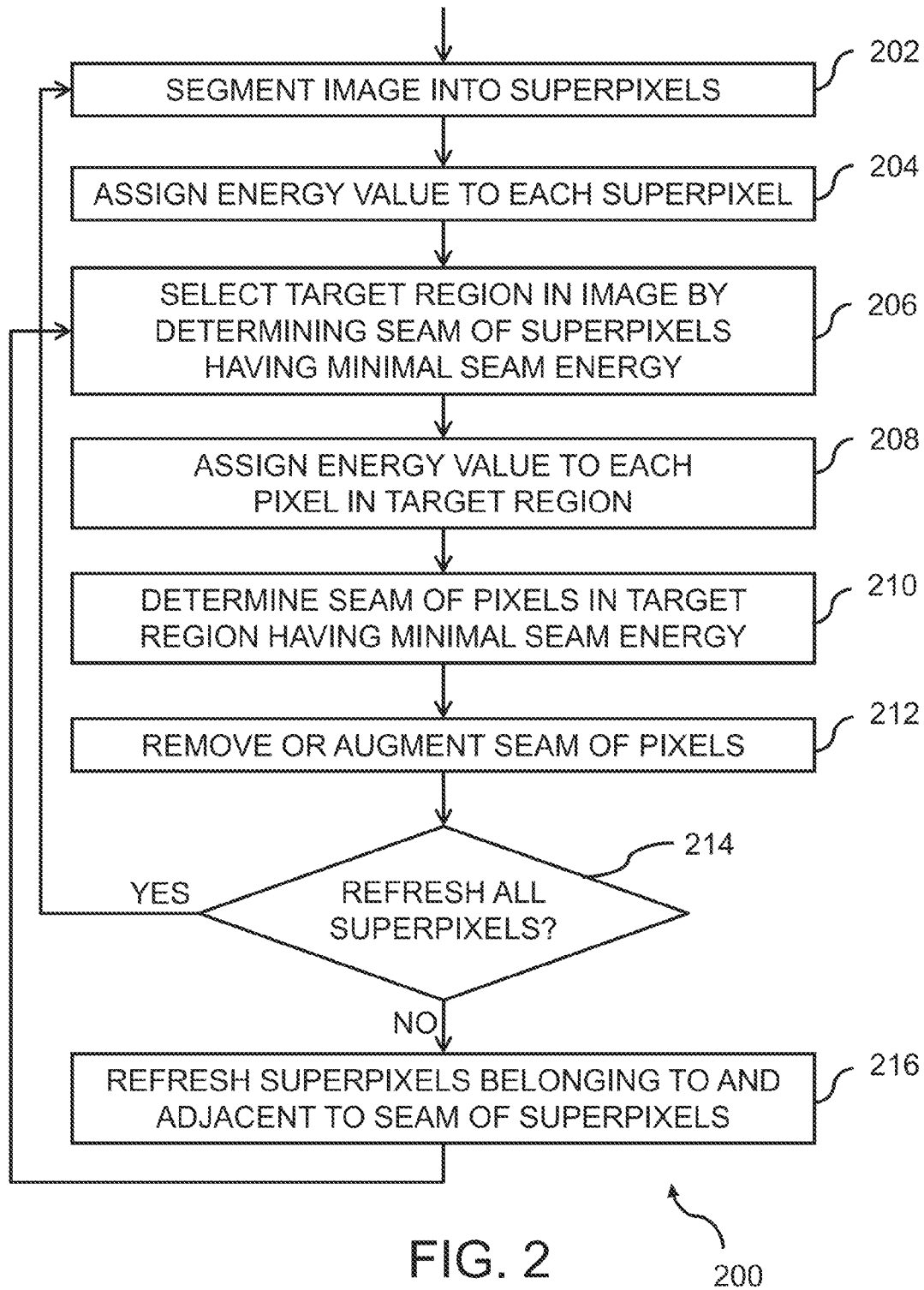
FIG. 2 is a simplified flow diagram of at least one embodiment of a method for content-aware resizing of a machine-readable image file using superpixels.

Referring now to FIG. 2, an illustrative embodiment of a method 200 for resizing a machine-readable image file using superpixels is shown as a simplified flow diagram. In the illustrative embodiment, the method 200 may be executed by the image co-processor 108 to resize an image captured by the camera 110 (and/or a machine-readable image file retrieved from the system memory 106). It is also contemplated that, in other embodiments, the method 200 may be performed by a multi-purpose processor, such as the processor 102 for instance. The method 200 is illustrated as a number of blocks 202-216 in FIG. 2.

The method 200 may be used to resize any type of image (e.g., color, grayscale, black-and-white, etcetera) from one size to any other size. For instance, the method 200 may be used to change the aspect ratio of an image from 4:3 to 16:9 without significantly affecting important image content. Where the image to be resized is a color image, the method 200 may optionally include the additional pre-processing stage of creating a supplementary grayscale or black-and-white image. The method 200 may then be performed on the supplementary grayscale or black-and-white image (thereby simplifying many of the processing stages), while the resulting image resizing (i.e., the removal or augmentation of pixels in block 212) is also applied to the color image. The method 200 will be described below with regard to an illustrative embodiment of an image 300 to be expanded in a horizontal dimension (with reference to FIGS. 3-5). It will be appreciated that the method 200 may also be used to shrink images in a horizontal dimension, expand images in a vertical dimension, shrink images in a vertical dimension, and any combination of these four operations.

Figure 3:
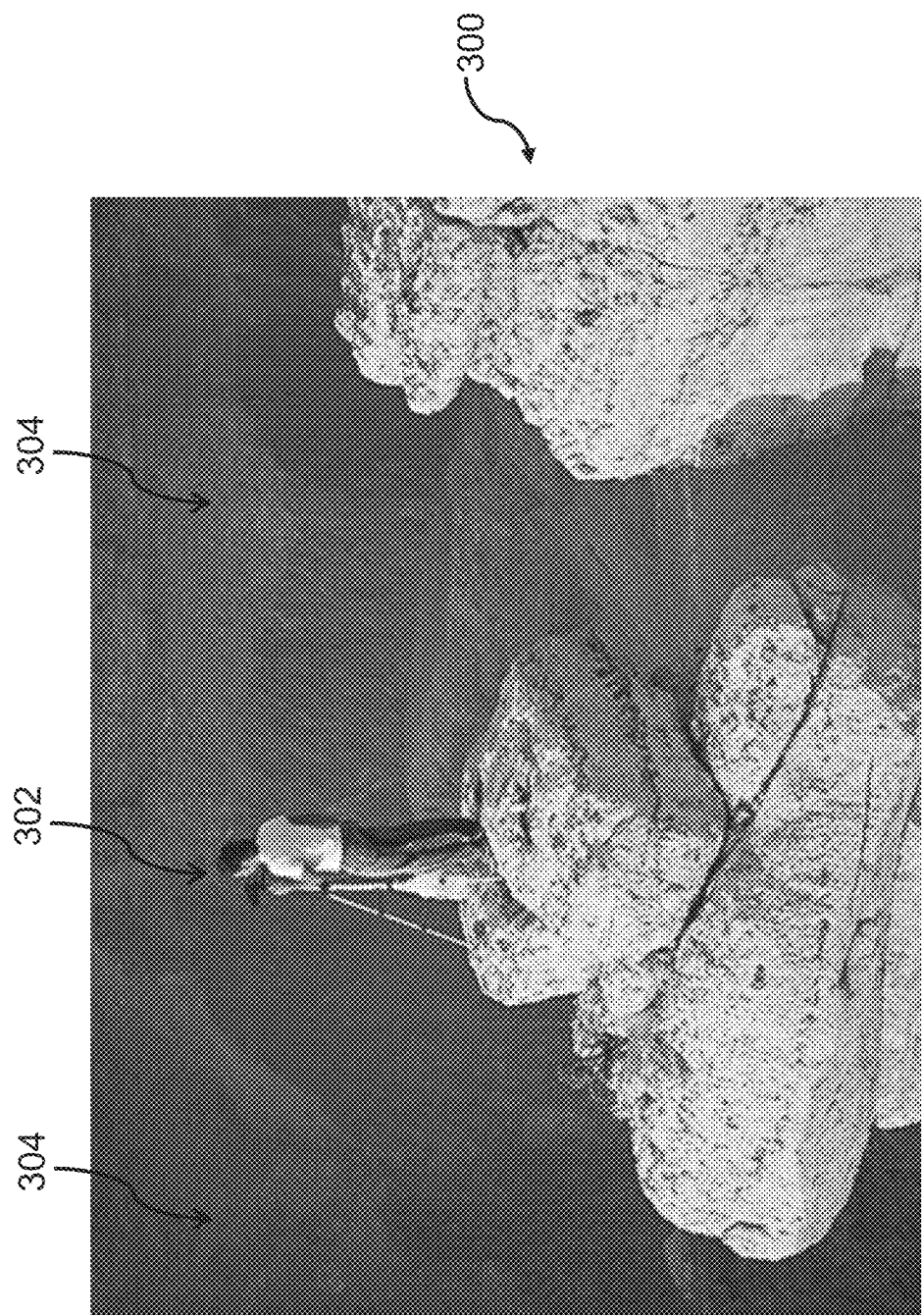
FIG. 3 illustrates at least one embodiment a machine-readable image file that may be resized using the method of FIG. 2.
Figure 4:
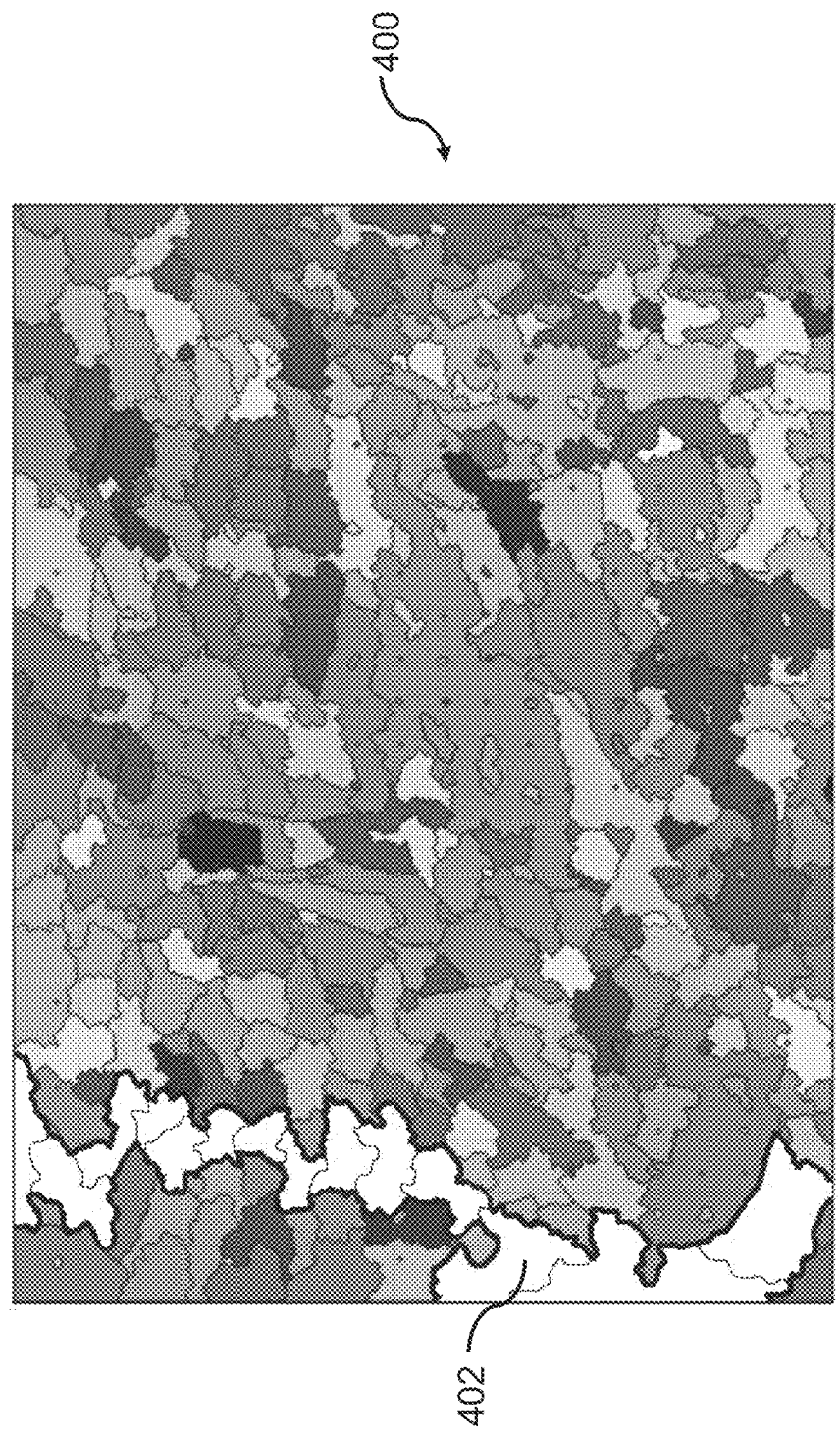
FIG. 4 illustrates at least one embodiment of the machine-readable image file of FIG. 3 segmented into a plurality of superpixels.

The method 200 begins with block 202 in which the image co-processor 108 segments an image into a plurality of superpixels. One illustrative embodiment of an image 300 is shown in FIG. 3, while the plurality of superpixels 400 generated for the image 300 are shown in FIG. 4. Each of the plurality of superpixels 400 corresponds to a plurality of pixels of the image 300. By segmenting the image 300 into a plurality of superpixels 400, the image co-processor 108 simplifies the number of nodes to be processed by any algorithm applied the superpixels 400 (rather than directly to the pixels of the image 300). By way of example, where each superpixel 400 corresponds to ten or more pixels of the image 300 the number of nodes to be processed will be reduced at least by a factor of ten. It is contemplated that the image 300 may be segmented into any number of superpixels 400 and that each superpixel 400 may correspond to any number of pixels of the image 300 (i.e., the superpixels 400 need not be of uniform size).

During block 202, the image co-processor 108 may use any suitable method for segmenting the image into a plurality of superpixels 400. In some embodiments, the image co-processor 108 may segment the image 300 into a plurality of superpixels 400 using a point cloud and a watershed algorithm. First, the image co-processor 108 may generate a point cloud in which each point corresponds to a plurality of pixels of the image 300. For instance, the image co-processor 108 may generate a point for each ten pixels of the image 300. It will be appreciated that, in other embodiments, each point in the point cloud may correspond to more or fewer pixels of the image 300. Second, the image co-processor 108 may apply the well-known watershed algorithm to the point cloud to generate the plurality of superpixels 400. A watershed algorithm segments an image by analyzing the gradient magnitude of the image as a topographic surface (i.e., points having the highest gradient magnitude intensities correspond to watershed lines, which represent superpixel boundaries).

After block 202, the method 200 proceeds to block 204 in which the image co-processor 108 assigns an energy value to each of the plurality of superpixels 400. Assigning an energy value to each superpixel 400 provides a mechanism for the image co-processor 108 to determine areas 302 of the image 300 that include important image content (i.e., areas that should not be significantly affected during content-aware image resizing) and areas 304 of the image 300 that do not include such image content (i.e., areas where pixels may be removed or augmented during content-aware image resizing). In some embodiments, the image co-processor 108 may assign a low energy value to superpixels 400 that are similar to neighboring superpixels 400 and may assign a high energy value to superpixels 400 that are dissimilar to neighboring superpixels 400. In other words, superpixels 400 corresponding to areas 302 of the image 300 with high contrast may be assigned high energy values, while superpixels 400 corresponding to areas 304 of the image 300 with low contrast may be assigned low energy values. The image co-processor 108 may use any suitable energy function to assign an energy value to each of the plurality of superpixels 400. For instance, one or more energy functions such as gradient magnitude, entropy, visual saliency, eye-gaze movement, object detections (e.g., faces, pedestrians), and the like may be used by the image co-processor 108 to assign an energy value to each superpixel 400 in block 204.

After block 204, the method 200 proceeds to block 206 in which the image co-processor 108 selects a target region 500 of pixels in the image 300 using a seam of superpixels 402 that extends across a dimension of the image 300. The seam of superpixels 402 is a set of superpixels 400 that extends from one edge of the image 300 to an opposite edge of the image 300. For instance, when resizing an image 300 in a horizontal dimension, the seam of superpixels 402 extends from the top edge to the bottom edge of the image 300 (i.e., across a vertical dimension of the image 300). Similarly, when resizing an image 300 in a vertical dimension, the seam of superpixels 402 extends from the left edge to the right edge of the image 300 (i.e., across a horizontal dimension of the image 300). In the illustrative embodiment, each superpixel 400 in the seam of superpixels 402 shares at least one boundary with another superpixel 400 in the seam of superpixels 402 to form a continuous seam across the image 300. It is contemplated that, in other embodiments, the seam of superpixels 402 may be a discontinuous seam. FIG. 4 illustrates one example of a continuous seam of superpixels 402 extending across the vertical dimension of the image 300 (with each of the superpixels 400 in the seam of superpixels 402 being unshaded).

Figure 5:
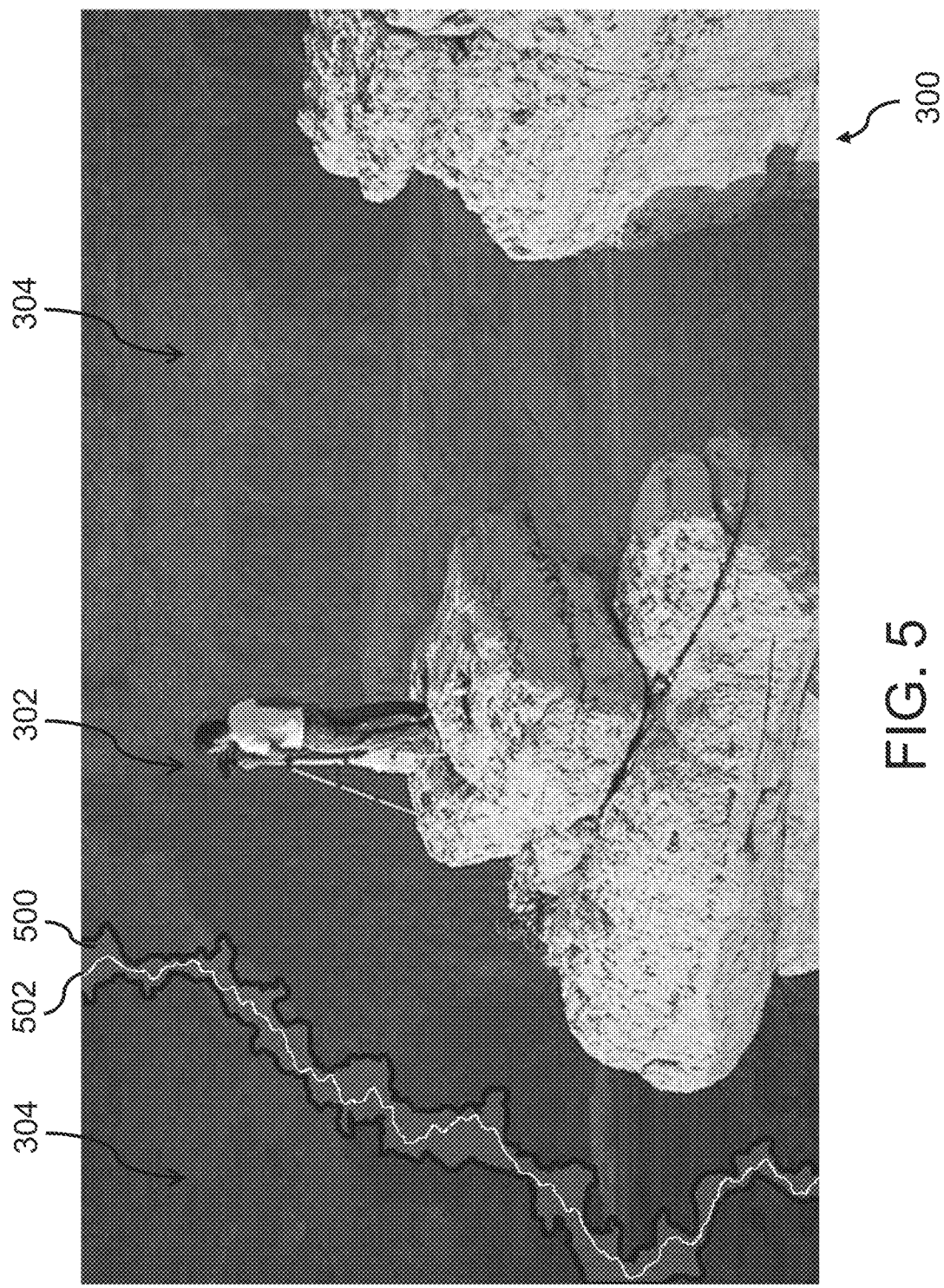
FIG. 5 illustrates at least one embodiment of the machine-readable image file of FIG. 3 resized using the method of FIG. 2.

During block 206, the image co-processor 108 may determine which superpixels 400 to include in the seam of superpixels 402 using any suitable method. In the illustrative embodiment of FIG. 2, the image co-processor 108 may determine a seam of superpixels 402 having a minimal seam energy using the energy values assigned to the superpixels 400 in block 204. By "minimal seam energy," the present disclosure contemplates both the seam of superpixels 402 having the lowest possible total energy value and also a seam of superpixels 402 that has a relatively low (but not necessarily the lowest) total energy value. The image co-processor 108 may determine a seam of superpixels 402 having a minimal seam energy using any algorithm for finding the shortest, or lowest cost, path through a directed graph, such as the well-known Dijkstra algorithm, or a variant thereof. In some embodiments, the image co-processor 108 may also consider previously selected seams of superpixels 402 to disfavor repetitive selection of the same seam of superpixels 402 during consecutive iterations of the method 200. After finding a seam of superpixels 402 that extends across a dimension of the image 300, the image co-processor 108 may select a target region 500 in the image 300 that includes the pixels corresponding to the seam of superpixels 402 (i.e. the pixels corresponding to each superpixel 400 in the seam of superpixels 402). FIG. 5 illustrates one example of a target region 500 selected in the image 300 (using a different seam of superpixels than the seam of superpixels 402 illustrated in FIG. 4).

After block 206, the method 200 proceeds to block 208 in which the image co-processor 108 assigns an energy value to each of the pixels in the target region 500. Assigning an energy value to each pixel in the target region 500 provides a mechanism for the image co-processor 108 to determine whether each such pixel includes important image content. In some embodiments, the image co-processor 108 may assign a low energy value to pixels that are similar to neighboring pixels and may assign a high energy value to pixels that are dissimilar to neighboring pixels. In other words, pixels having high contrast with neighboring pixels may be assigned high energy values, while pixels having low contrast with neighboring pixels may be assigned low energy values. The image co-processor 108 may use any suitable energy function to assign an energy value to each of the pixels in the target region 500. For instance, one or more energy functions such as gradient magnitude, entropy, visual saliency, eye-gaze movement, object detections (e.g., faces, pedestrians), and the like may be used by the image co-processor 108 to assign an energy value to each pixel in the target region 500. It will be appreciated that it is unnecessary for the image co-processor 108 to assign energy values to pixels outside of the target region 500 in block 208.

After block 208, the method 200 proceeds to block 210 in which the image co-processor 108 selects a seam of pixels 502 in the target region 500. The seam of pixels 502 is a set of pixels in the target region 500 that extends from one edge of the image 300 to an opposite edge of the image 300. For instance, when resizing an image 300 in a horizontal dimension, the seam of pixels 502 extends from the top edge to the bottom edge of the image 300 (i.e., across a vertical dimension of the image 300). Similarly, when resizing an image 300 in a vertical dimension, the seam of pixels 502 extends from the left edge to the right edge of the image 300 (i.e., across a horizontal dimension of the image 300). In the illustrative embodiment, the seam of pixels 502 is one pixel wide and is eight-connected to form a continuous seam across the image 300. It is contemplated that, in other embodiments, the seam of pixels 502 may be a discontinuous seam. FIG. 5 illustrates one example of a continuous seam of pixels 502 extending across the vertical dimension of the image 300 (with each of the pixels in the seam of pixels 502 being unshaded).

During block 210, the image co-processor 108 may determine which pixels to include in the seam of pixels 502 using any suitable method. In the illustrative embodiment of FIG. 2, the image co-processor 108 may determine a seam of pixels 502 having a minimal seam energy using the energy values assigned to the pixels in block 208. By "minimal seam energy," the present disclosure contemplates both the seam of pixels 502 having the lowest possible total energy value and also a seam of pixels 502 that has a relatively low (but not necessarily the lowest) total energy value. The image co-processor 108 may determine a seam of pixels 502 having a minimal seam energy using any algorithm for finding the shortest, or lowest cost, path through a directed graph, such as the well-known Dijkstra algorithm, or a variant thereof. It will be appreciated that it is unnecessary for the image co-processor 108 to consider pixels outside of the target region 500 as candidates for inclusion in the seam of pixels 502. This smaller solution space may significantly reduce the time and/or computational power needed to determine a seam of pixels 502 having a minimal seam energy (as compared to algorithms that consider every pixel in the image 300 when selecting a seam of pixels).

After block 210, the method 200 proceeds to block 212 in which the image co-processor 108 resizes the image 300 by removing or augmenting the seam of pixels 502. When using the method 200 to shrink a dimension of the image 300, the image co-processor 108 may remove each pixel of the seam of pixels 502 from the image 300. Alternatively, when using the method 200 to expand a dimension of the image 300, the image co-processor 108 may augment the seam of pixels 502 by inserting a new pixel immediately adjacent each pixel in the seam of pixels 502 (either above, below, left, or right of each pixel in the seam of pixels 502, depending on the dimension in which the image 300 is to be expanded). In some embodiments, the image co-processor 108 may insert new pixels that are copies of the pixels in the seam of pixels 502. In other embodiments, the image co-processor 108 may determine the intensity (or color) of the new pixels by averaging the intensities for colors) of neighboring pixels.

After block 212, the method 200 proceeds to block 214 in which the image co-processor 108 determines whether all superpixels 400 should be refreshed during the next iteration of the method 200. In many instances, after the seam of pixels 502 has been removed or augmented in block 212, it will be not be necessary to update all of the superpixels 400 previously generated in block 202. In some instances (e.g., after several iterations of the method 200), however, the image 300 will have become significantly modified from the version of the image 300 that was used to generate the plurality of superpixels 400 in block 202. Thus, as shown in FIG. 2, if the image co-processor 108 determines in block 214 that all superpixels 400 should be refreshed during the next iteration, the method 200 returns to block 202 in which the image co-processor 108 re-segments the image into a new plurality of superpixels 400. In some embodiments of the method 200, the image co-processor 108 may generate a new point cloud for the image 300 and apply a watershed algorithm to the new point cloud to generate the new plurality of superpixels 400. As described above with reference to block 204, the image co-processor 108 will then assign an energy value to each of the new superpixels 400 before determining a new target region 500 in block 206.

If the image co-processor 108 instead determines in block 214 that all superpixels 400 need not be refreshed during the next iteration, the method 200 proceeds to block 216 in which the image co-processor 108 refreshes only the superpixels 400 belonging to the seam of superpixels 402 and the superpixels 400 adjacent to the seam of superpixels 402. First, the image co-processor 108 may update the superpixels 400 belonging to the seam of superpixels 402 to reflect the resizing of the image 300 performed in block 212. For instance, where pixels were removed from the image 300 in block 212, the image co-processor 108 may remove these pixels from the plurality of pixels corresponding to each affected superpixel 400. Alternatively, where pixels were added to the image 300 in block 212, the image co-processor 108 may add these pixels to the plurality of pixels corresponding to each affected superpixel 400. Second, the image co-processor 108 may assign a new energy value to each superpixel 400 belonging to or adjacent to the seam of superpixels 402. The removal or addition of pixels in block 212 may change the energy values of superpixels 400 belonging to the seam of superpixcls 402, as well as the energy values of superpixels 400 adjacent to the seam of superpixels 402. The energy values of the remaining superpixels 400, however, are usually not affected the resizing of the image 300 in block 212 and need not be re-calculated. After block 216, the method 200 returns to block 206 in which the image co-processor 108 determines a new target region 500.

Thus, by implementing the method 200 the image co-processor 108 may allow a user of the computing device 100 to perform on-the-fly editing of images captured by the camera 110. Using successive iterations of the method 200, the image co-processor 108 may remove and/or augment any number of seams of pixels 502 in a horizontal dimension and/or a vertical dimension to achieve any desired resizing of an image 300. As illustrated in FIG. 5, the method 200 resizes the image 300 while preserving the areas 302 of the image 300 that include important image content and modifying only the areas 304 of the image 300 that do not include such image content. It will be appreciated by those of ordinary skill that, while illustrated in FIG. 2 as a two-level algorithm (i.e., a pixel level and a superpixel level), the method 200 may also be implemented as an algorithm having any number of levels. By way of example, the method 200 might be implemented as an algorithm having a pixel level, a superpixel level, and a super-superpixel level.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

The invention claimed is:

1. A computing device comprising:
a camera; and
an image co-processor to (i) segment an image captured by the camera into a plurality of superpixels, each of the plurality of superpixels corresponding to a plurality of pixels of the image, (ii) select a seam of superpixels in the image extending across a dimension of the image, (iii) select a seam of pixels within the seam of superpixels, the seam of pixels extending across the dimension of the image, and (iv) resize the image by removing or augmenting the seam of pixels.

2. The computing device of claim 1, wherein to segment the image into the plurality of superpixels comprises to:
generate a point cloud comprising a plurality of points that each correspond to a plurality of pixels of the image; and
apply a watershed algorithm to the point cloud to generate the plurality of superpixels.

3. The computing device of claim 2, wherein to generate the point cloud comprises to generate a plurality of points that each correspond to ten or more pixels of the image.

4. The computing device of claim 1, wherein the image co-processor is further to re-segment the image into a new plurality of superpixels, after resizing the image.

5. The computing device of claim 1, wherein to select the seam of superpixels in the image comprises to:
assign an energy value to each of the plurality of superpixels; and determine a seam of superpixels having a minimal seam energy using the assigned energy values.

6. The computing device of claim 5, wherein to assign an energy value to each of the plurality of superpixels comprises to:
assign a low energy value to superpixels that are similar to neighboring superpixels; and
assign a high energy value to superpixels that are dissimilar to neighboring superpixels.

7. The computing device of claim 5, wherein the image co-processor is further to assign a new energy value to each superpixel belonging to the seam of superpixels and to each superpixel adjacent to the seam of superpixels, after resizing the image.

8. The computing device of claim 1, wherein to select the seam of pixels within the seam of superpixels comprises to:
assign an energy value to each of the pixels within the seam of superpixels; and
determine a seam of pixels within the seam of superpixels having a minimal seam energy using the assigned energy values.

9. The computing device of claim 7, wherein to assign an energy value to each of the pixels within the seam of superpixels comprises to:
assign a low energy value to pixels that are similar to neighboring pixels; and
assign a high energy value to pixels that are dissimilar to neighboring pixels.

10. A method comprising:
segmenting a machine-readable image file into a plurality of superpixels, each of the plurality of superpixels corresponding to a plurality of pixels of the machine-readable image file;
selecting a seam of superpixels in the machine-readable image file extending across a dimension of the machine-readable image file;
selecting a seam of pixels within the seam of superpixels, the seam of pixels extending across the dimension of the machine-readable image file; and
resizing the machine-readable image file by removing or augmenting the seam of pixels.

11. The method of claim 10, wherein segmenting the machine-readable image file into the plurality of superpixels comprises:
generating a point cloud comprising a plurality of points that each correspond to a plurality of pixels of the machine-readable image file; and
applying a watershed algorithm to the point cloud to generate the plurality of superpixels.

12. The method of claim 11, wherein generating the point cloud comprises generating a plurality of points that each correspond to ten or more pixels of the machine-readable image file.

13. The method of claim 10, further comprising re-segmenting the machine-readable image file into a new plurality of superpixels, after resizing the machine-readable image file.

14. The method of claim 10, wherein selecting the seam of superpixels in the machine-readable image file comprises:
assigning an energy value to each of the plurality of superpixels; and
determining a seam of superpixels having a minimal seam energy using the assigned energy values.

15. The method of claim 14, further comprising assigning a new energy value to each superpixel belonging to the seam of superpixels and to each superpixel adjacent to the seam of superpixels, after resizing the machine-readable image file.

16. The method of claim 10, wherein selecting the seam of pixels within the seam of superpixels comprises:
assigning an energy value to each of the pixels within the seam of superpixels; and
determining a seam of pixels within the seam of superpixels having a minimal seam energy using the assigned energy values.

17. One or more non-transitory machine-readable media comprising a plurality of instructions that, in response to being executed, cause a processor of a computing device to:
segment a machine-readable image file into a plurality of superpixels, each of the plurality of superpixels corresponding to a plurality of pixels of the machine-readable image file;
select a seam of superpixels in the machine-readable image file extending across a dimension of the machine-readable image file;
select a seam of pixels within the seam of superpixels, the seam of pixels extending across the dimension of the machine-readable image file; and
resize the machine-readable image file by removing or augmenting the seam of pixels.

18. The one or more non-transitory machine-readable media of claim 17, wherein the plurality of instructions further cause the processor to re-segment the machine-readable image file into a new plurality of superpixels, after resizing the machine-readable image file.

19. The one or more non-transitory machine-readable media of claim 17, wherein to select the seam of superpixels in the machine-readable image file comprises to:
assign an energy value to each of the plurality of superpixels; and
determine a seam of superpixels having a minimal seam energy using the assigned energy values.

20. The one or more non-transitory machine-readable media of claim 19, wherein to assign an energy value to each of the plurality of superpixels comprises to:
assign a low energy value to superpixels that are similar to neighboring superpixels; and
assign a high energy value to superpixels that are dissimilar to neighboring superpixels.

21. The one or more non-transitory machine-readable media of claim 19, wherein the plurality of instructions further cause the processor to assign a new energy value to each superpixel belonging to the seam of superpixels and to each superpixel adjacent to the seam of superpixels, after resizing the machine-readable image file.

22. The one or more non-transitory machine-readable media of claim 17, wherein to select the seam of pixels within the seam of superpixels comprises to:
assign an energy value to each of the pixels within the seam of superpixels; and
determine a seam of pixels within the seam of superpixels having a minimal seam energy using the assigned energy values.

23. The one or more non-transitory machine-readable media of claim 22, wherein to assign an energy value to each of the pixels within the seam of superpixels comprises to:
assign a low energy value to pixels that are similar to neighboring pixels; and
assign a high energy value to pixels that are dissimilar to neighboring pixels.

24. The one or more non-transitory machine-readable media of claim 17, wherein to segment the machine-readable image file into the plurality of superpixels comprises to:

generate a point cloud comprising a plurality of points that each correspond to a plurality of pixels of the machine-readable image file; and apply a watershed algorithm to the point cloud to generate the plurality of superpixels.

25. The one or non-transitory more machine-readable media of claim 24, wherein to generate the point cloud comprises to generate a plurality of points that each correspond to ten or more pixels of the machine-readable image file.

* * * * *